United States Patent
Bray et al.

(10) Patent No.: US 11,987,220 B2
(45) Date of Patent: May 21, 2024

(54) GEAR BOX AND SELF-PROPELLED WHEELED VEHICLE EQUIPPED WITH A GEAR BOX

(71) Applicant: FRANCE REDUCTEURS, Les Herbiers (FR)

(72) Inventors: Sébastien Bray, Les Epesses (FR); Fabien Guiroult, Saint Hilaire le Vouhis (FR)

(73) Assignee: FRANCE REDUCTEURS, Les Herbiers (FR)

( * ) Notice: Subject to any disclaimer, the term of this patent is extended or adjusted under 35 U.S.C. 154(b) by 0 days.

(21) Appl. No.: 18/016,340

(22) PCT Filed: Jun. 23, 2021

(86) PCT No.: PCT/FR2021/051146
§ 371 (c)(1),
(2) Date: Jan. 14, 2023

(87) PCT Pub. No.: WO2022/018335
PCT Pub. Date: Jan. 27, 2022

(65) Prior Publication Data
US 2023/0271592 A1     Aug. 31, 2023

(30) Foreign Application Priority Data
Jul. 21, 2020  (FR) ...................................... 20 07661

(51) Int. Cl.
*F16D 49/16* (2006.01)
*B60T 1/06* (2006.01)
(Continued)

(52) U.S. Cl.
CPC .............. *B60T 1/062* (2013.01); *F16D 49/16* (2013.01); *F16D 65/22* (2013.01); *F16D 2125/64* (2013.01)

(58) Field of Classification Search
CPC .... F16D 49/16; F16D 65/22; F16D 2065/024; F16D 2125/64; B60T 1/062
See application file for complete search history.

(56) References Cited

U.S. PATENT DOCUMENTS 3,924,479 A * 12/1975 Lanzenberger ........... F16B 1/04
                                                                 188/134
2008/0314696 A1   12/2008  Blanchard
2015/0252899 A1    9/2015  Blanchard

FOREIGN PATENT DOCUMENTS

DE    102016216300 A1 *  3/2018  ............. F16D 55/38
FR      2 940 773          7/2010

OTHER PUBLICATIONS

International Search Report dated Dec. 17, 2020.

* cited by examiner

*Primary Examiner* — David R Morris
(74) *Attorney, Agent, or Firm* — IPSILON USA, LLP

(57) ABSTRACT

Gear box (1) comprising a gearbox body (2) defining a cavity (3) and, housed inside the cavity (3), an output shaft, and a braking device mounted on a rotating shaft (9), this braking device comprising two activatable brakes (61, 62), two stops (71, 72) mechanically coupled to one another and surrounding the brakes (61, 62), and a control member (8) for moving the brakes (61, 62), common to the two brakes (61, 62), and mounted to move between an inactive braking position and an active braking position, at least one of the stops (71, 72) forming an end-of-travel stop limiting the movement of the brakes (61, 62) in the active braking position of the control member (8). The shaft (9) equipped with the braking device is formed from two coaxial shaft sections (91, 92), mounted to freely rotate in relation to one another, and each equipped with one of the brakes (61, 62) of the braking device, the brakes (61, 62) are cone brakes (Continued)

and the stops (71, 72) form an assembly mounted to be able to move axially along the shaft (9), this assembly being separated in rotation from the shaft (9) or at least one of the sections of the shaft (9).

11 Claims, 12 Drawing Sheets

(51) Int. Cl.
*F16D 65/22* (2006.01)
*F16D 125/64* (2012.01)

GEAR BOX AND SELF-PROPELLED WHEELED VEHICLE EQUIPPED WITH A GEAR BOX

RELATED APPLICATION

This application is a National Phase of PCT/FR2021/051146 filed on Jun. 23, 2021, which claims the benefit of priority from French Patent Application No. 20 07661, filed on Jul. 21, 2020, the entirety of which are incorporated by reference.

FIELD OF THE INVENTION

The present invention concerns a gearbox and a wheeled vehicle equipped with a gearbox of this kind.

It concerns in particular a gearbox comprising at least one gearbox body delimiting at least one cavity and housed at least partly inside the cavity at least one output shaft, and a braking device mounted on a rotary shaft, this braking device comprising two activatable brakes, two stops coupled mechanically to one another and one on each side of said brakes, and a control member for moving said brakes away from one another to pass the brakes from an inactive state to an active state, this control member common to the two brakes being disposed between said brakes and mounted to be mobile between an inactive position and an active braking position to pass the brakes from an inactive state to an active state, said stops forming end-of-travel stops limiting the movement of the brakes away from one another in the active braking position of the control member.

PRIOR ART

A gearbox of this kind for a self-propelled wheeled vehicle in which the output shaft of the gearbox forms the drive shaft of the wheels of the vehicle is known, as the documents US 2015/252899, US 2008/314696 and FR 2940773 illustrate. Some vehicles have a multisection output shaft to enable driving of the two wheels of the vehicle equipping said output shaft at different speeds. These different speeds can enable the vehicle to be steered by means of said wheels which then form both steerable wheels and driving wheels. However, in the case of vehicles of this type, the design of these gearboxes has not made it possible until now to integrate a braking device inside the gearbox.

OBJECTS AND SUMMARY

One object of the invention is to propose a gearbox of the aforementioned type the design of which enables integration of the braking device inside the gearbox including in the case of a multisection output shaft, without adversely affecting the compactness of the braking device.

To this end the invention has for object a gearbox comprising at least one gearbox body delimiting at least one cavity and housed at least partly inside the cavity, at least one output shaft, and a braking device mounted on a rotary shaft, this braking device comprising two activatable brakes, two stops coupled mechanically to one another and one on each side of said brakes, and a control member for driving said brakes in movement in the direction away from or toward one another for the brakes to pass from an inactive state to an active state, this control member, common to the two brakes, being mounted to be mobile between an inactive position and an active braking position for the brakes to pass from an inactive state to an active state, at least one of the stops forming an end-of-travel stop limiting the movement of the brakes in the active braking position of the control member, each brake being a cone brake comprising two parts with substantially coaxial conical surfaces surrounding the shaft equipped with the braking device, characterised in that the shaft equipped with the braking device is formed of at least two coaxial shaft sections mounted to rotate freely relative to one another and each provided with one of the brakes of the braking device, in that one of the two parts with conical surfaces of each brake, termed the male cone, is mounted on and constrained to rotate with one of the shaft sections of said shaft equipped with the braking device, in that the other of the two parts with conical surfaces of each brake, termed the female cone, is mounted on and fixed against rotation relative to said shaft, and in that said stops form an assembly mounted so as to be movable axially along the shaft equipped with the braking device, this assembly being not constrained to rotate with said shaft or at least one of the sections of said shaft.

It must be noted that the shaft equipped with the braking device may form the output shaft or be separate from the output shaft and engaged directly or indirectly with the output shaft.

In accordance with one embodiment of the invention, the output shaft is formed of at least two coaxial shaft sections mounted to rotate freely relative to one another, the output shaft is the shaft equipped with the braking device or extends parallel to the shaft equipped with the braking device, and the shaft sections provided with a brake of the shaft equipped with the braking device are, when the shaft equipped with the braking device is separate from the output shaft, engaged directly or indirectly, one with one of the shaft sections of the output shaft, the other with the other of the shaft sections of the output shaft. This configuration allows the mounting of a gearbox of this kind on a vehicle the wheels of which can be used both as driving wheels and steerable wheels by causing the rotation speed of each of the wheels on the output shaft equipped with a wheel at each of its ends to vary.

In accordance with one embodiment of the invention, the assembly formed by the stops is mounted so it is fixed against rotation or limited in angular movement relative to the shaft equipped with the braking device. Thus the shaft equipped with the braking device is able to turn whereas the set of stops is fixed in rotation inside the gearbox, that is to say does not turn.

In accordance with one embodiment of the invention, the stops in the coupled state define between them a gap of fixed maximum length. Thus the walls of the gearbox can be preserved, the thrust forces being contained inside said gap formed by the stops.

In accordance with one embodiment of the invention, the stops are coupled to one another by means of screw/nut type connecting members and held at a distance from one another by spacers mounted on said connecting members.

In accordance with one embodiment of the invention, the stops each take the form of a plate provided with a through-bore so that the shaft equipped with the braking device is able to pass through them.

In accordance with one embodiment of the invention, the control member driving movement of said brakes is a control member driving movement of the brakes away from one another for the brakes to pass from an inactive state to an active state, this control member, common to the two brakes, is disposed between said brakes and mounted to be mobile between an inactive position and an active braking position for the brakes to pass from an inactive state to an active state, and said stops forming end-of-travel stops limiting the movement of the brakes away from one another in an active braking position of the control member.

In accordance with one embodiment of the invention, the gearbox includes a system for driving in rotation the shaft equipped with the braking device and said system is configured to enable driving in rotation of the shaft sections provided with a brake of the shaft equipped with the braking device at different rotation speeds.

In accordance with one embodiment of the invention, the gearbox comprises two electric motors disposed outside the body of the gearbox and carried by said body, each motor being equipped with a motor shaft, said motor shafts being coupled directly or indirectly, one with one of the shaft sections, the other with the other or another of the shaft sections of the shaft equipped with the braking device. It is therefore possible to drive the shaft sections of the shaft equipped with the braking device at different speeds and/or in different rotation directions.

In accordance with one embodiment of the invention, the electric motors are connected by at least three rods extending parallel to the output shaft and in that the gearbox body defines at least one stop limiting movement of the assembly formed by the rods and the motors about an axis parallel to the output shaft. This design makes it possible to guarantee a parallel relationship or a coaxial position of the drive shafts.

The invention also has for object a self-propelled wheeled vehicle equipped with a gearbox, characterised in that the gearbox is of the aforementioned type.

BRIEF DESCRIPTION OF THE DRAWINGS

The invention will be clearly understood on reading the following description of embodiments with reference to the appended drawings, in which.

DETAILED DESCRIPTION

Figure 1:
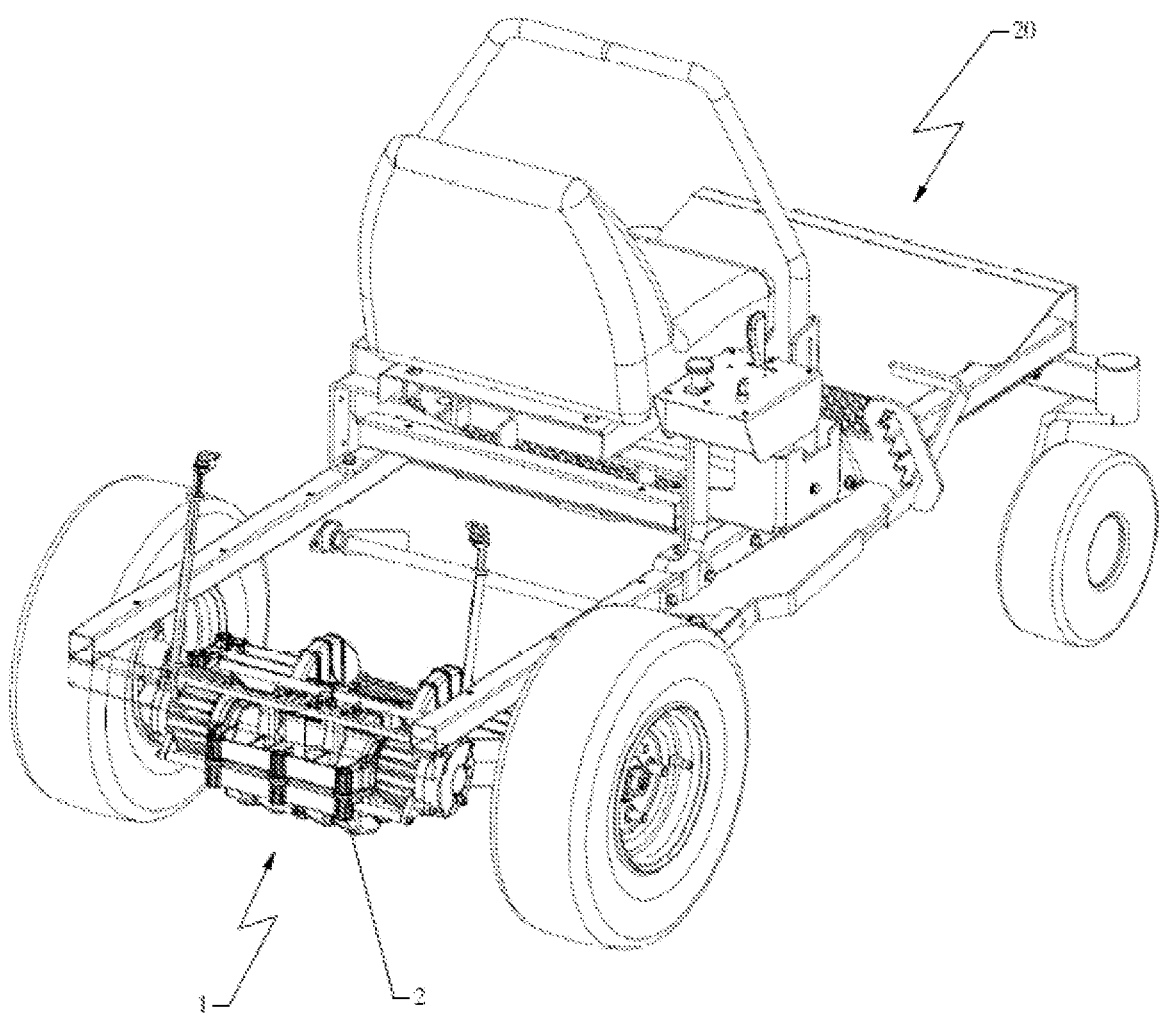
FIG. 1 represents a perspective view of a self-propelled wheeled vehicle in accordance with the invention.

As mentioned hereinabove the gearbox 1 may be applied to any type of self-propelled wheeled vehicle. An example of a self-propelled vehicle of this kind is given in FIG. 1. This vehicle 20, which may be a lawnmower, for example, comprises two front wheels and two rear wheels. The rear wheels are connected to one another by a shaft. This shaft constitutes the output shaft of the gearbox 1 to be described hereinafter. In the example represented this shaft is a shaft with multiple sections mounted to rotate freely relative to one another to enable driving of the rear wheels at different rotation speeds. Moreover, these rear wheels may be driven in rotation in different rotation directions. The wheels therefore here serve both as driving wheels and steerable wheels.

Moreover, the vehicle 20 is equipped in its driver station with a braking control the connection of which with a braking device 5 equipping the gearbox 1 will be described hereinafter.

The gearbox 1 therefore comprises a gearbox body 2. That gearbox body 2, generally made of synthetic material, is formed of two half-shells assembled on a joint plane. This gearbox body 2 when in a closed state delimits a cavity 3 inside which are housed at least partly a certain number of elements. In particular, an output shaft 4, which as mentioned hereinabove forms the drive shaft of the rear wheels of the vehicle, is partly housed inside the cavity 3 delimited by the gearbox body 2.

Figure 2:
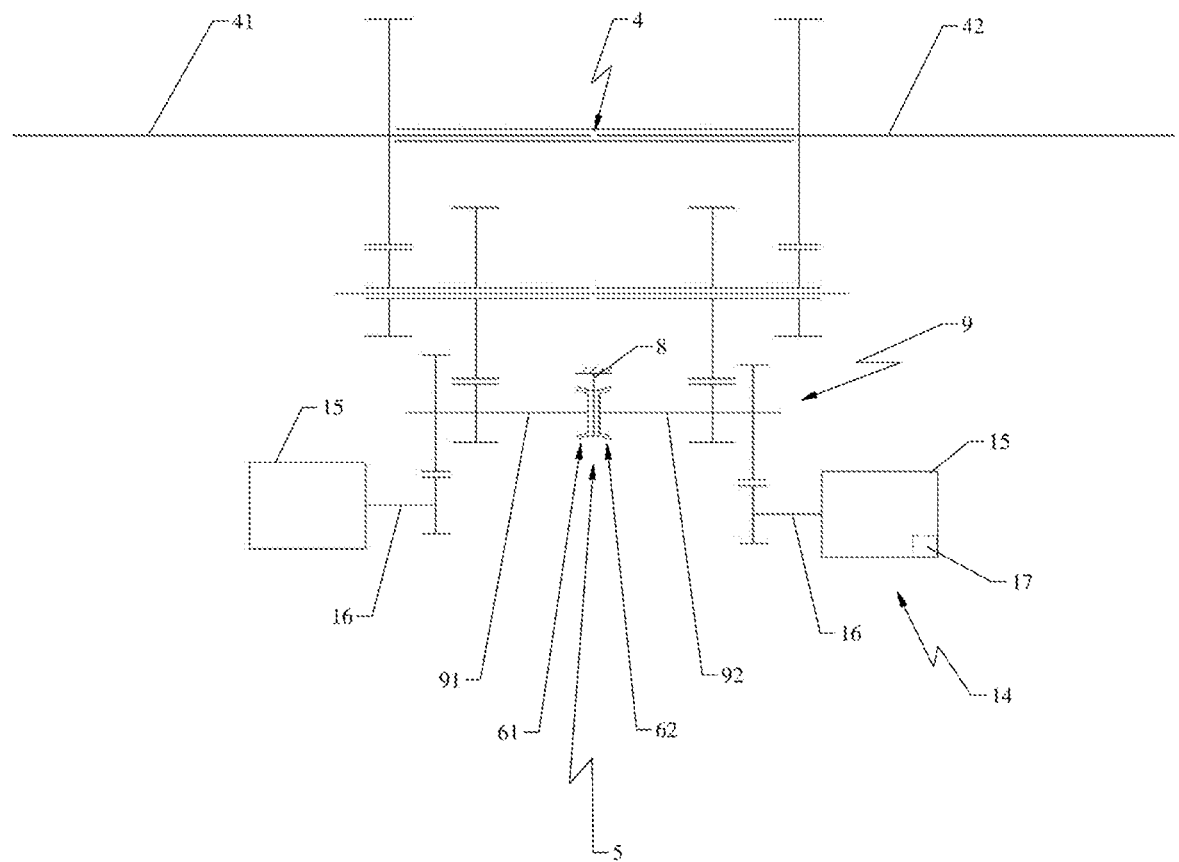
FIG. 2 represents a schematic view of a transmission of movement between the motors and the output shaft of the gearbox.
Figure 3:
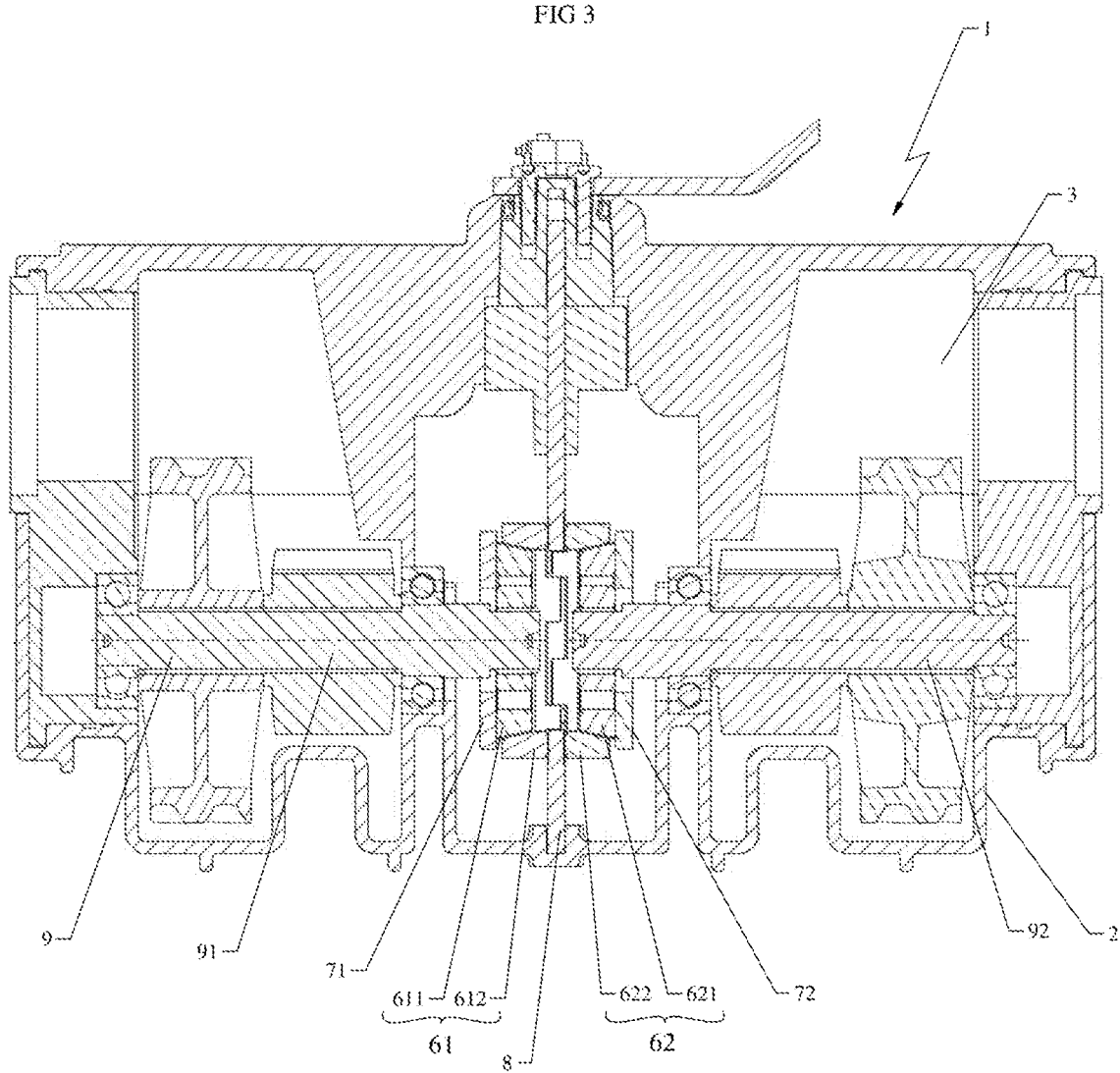
FIG. 3 represents a partial view in section of a gearbox in accordance with the invention.
Figure 4:
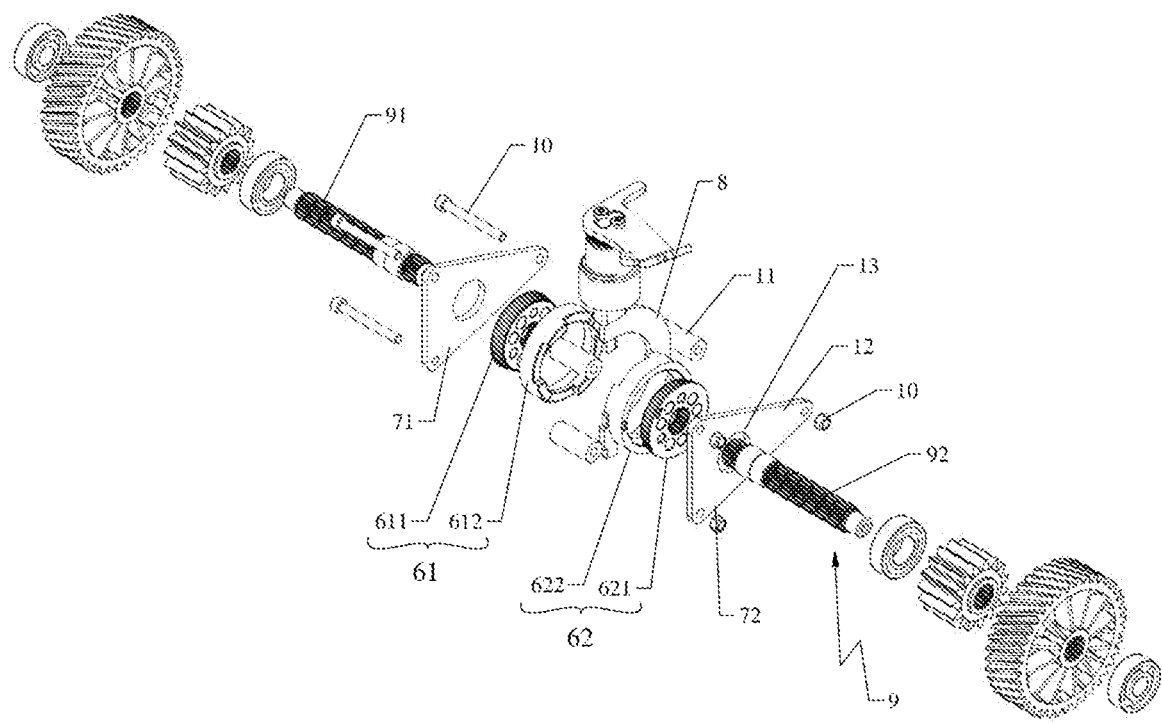
FIG. 4 represents an exploded view of the elements of the shaft equipped with the braking device.

In the examples represented this output shaft 4 is formed of two coaxial shaft sections 41, 42 mounted to rotate freely relative to one another. Those two shaft sections 41 and 42 are connected to one another by a sleeve, as illustrated in FIG. 2, to allow such independence in rotation.

Figure 12:
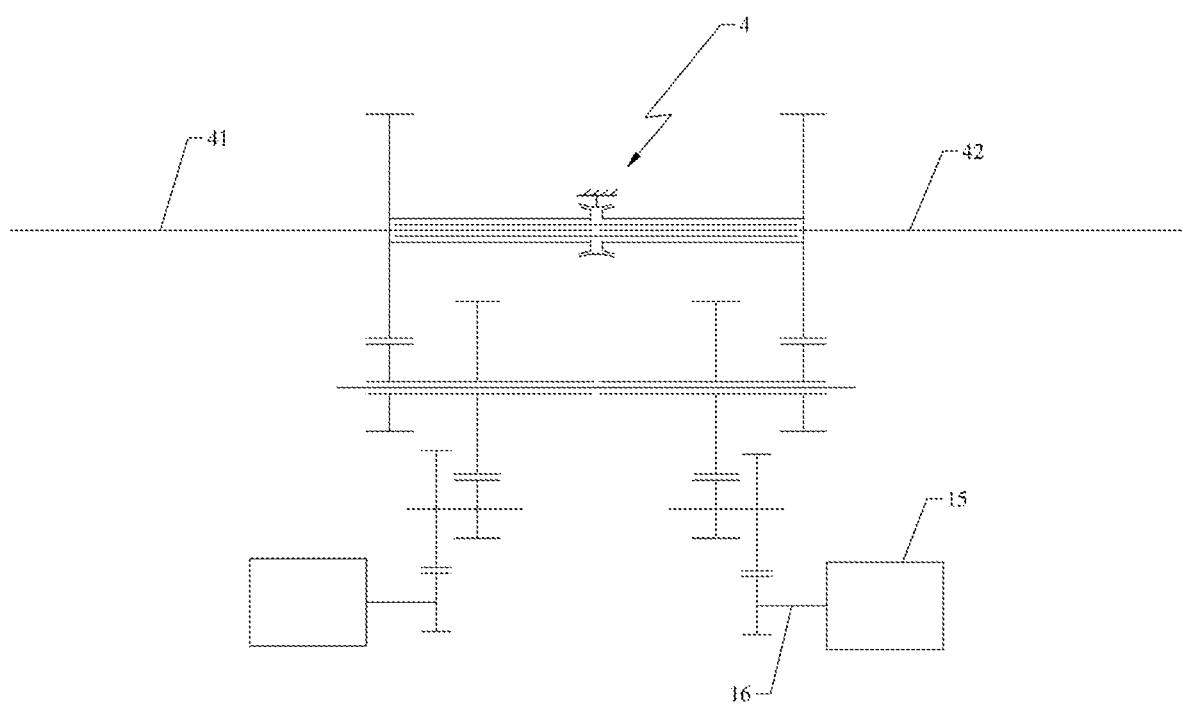
FIG. 12 represents a schematic view of a transmission of movement between the motors and the output shaft of the gearbox.

The gearbox 1 further comprises a braking device 5 mounted on a rotary shaft 9. This shaft 9 equipped with the braking device 5 may form the output shaft 4 or be a shaft 9 separate from the output shaft and engaged directly or indirectly with the output shaft 4. Transmission of movement in rotation from the shaft 9 equipped with the braking device 5 to the output shaft 4 is allowed. The braking device 5 comprises two activatable brakes 61, 62, two stops 71 and 72 mechanically coupled to one another and one on each side of said brakes 61, 62, and a control member 8 for moving the brakes 61 and 62 away from one another to pass the brakes 61 and 62 from an inactive state to an active state. The shaft 9 equipped with the braking device 5 is formed of two coaxial shaft sections 91, 92 mounted to rotate freely relative to one another. Each section is provided with one of the brakes of the braking device 5. Thus the shaft section 91 is provided with the brake 61 while the shaft section 92 is provided with the brake 62. The shaft 9 equipped with the braking device 5 may be the output shaft 4, as illustrated in FIG. 12. As an alternative and as illustrated in FIG. 2, the shaft 9 equipped with the braking device 5 extends parallel to the shaft 9 equipped with the braking device 5 and the sections 91 and 92 provided with a brake 61, 62 of the shaft equipped with the braking device 5 are engaged directly or indirectly one with one of the output shaft 4 sections, the other with the other of the output shaft sections of the output shaft 4. By direct engagement is meant that the movement in rotation of the shaft section 91 (or respectively 92) of the shaft 9 equipped with the braking device 5 is transmitted directly to the shaft section 41 (or respectively 42) of the output shaft 4. By indirect engagement is meant that the transmission of this movement in rotation is effected for example via an intermediate shaft disposed between the shaft 9 equipped with the braking device 5 and the output shaft 4, as in the example represented in FIG. 2. This intermediate shaft is again a multisection shaft. Independently of the length of the movement transmission chain, the movement in rotation of the shaft section 91 of the shaft 9 is transmitted to the shaft section 41 of the output shaft 4 and the movement in rotation of the shaft section 92 of the shaft 9 is transmitted to the shaft section 42 of the output shaft 4.

To enable the shaft 9 equipped with the braking device 5 to be driven in rotation the gearbox 1 comprises a system 14 for driving the shaft 9 equipped with the braking device 5 in rotation. This rotation driving system 14 is configured to enable driving in rotation of the shaft sections 91 and 92 provided one with the brake 61, the other with the brake 62 at different rotation speeds. As an alternative, the sections 91 and 92 of the shaft 9 equipped with the braking device 5 may be driven in rotation at the same speed.

This system 14 for driving the shaft 9 equipped with the braking device 5 in rotation can take many forms. In the example represented the system 14 for driving the shaft 9 equipped with the braking device 5 in rotation comprises two electric motors 15 disposed outside the body 2 of the gearbox and carried by said body 2. Each motor 15 is equipped with a motor shaft 16. The motor shafts 16 are coupled directly or indirectly one with one of the shaft sections 91 or 92, the other with the other or another of the shaft sections 91 or 92 of the shaft 9 equipped with the braking device 5. This coupling may therefore again be direct or indirect.

In the example represented in FIG. 2 the motor shaft 16 of each motor 15 is equipped with a gear. This gear meshes with a gear carried by a shaft section of the shaft 9 equipped with the braking device 5 for direct transmission of the movement in rotation of the motor shaft 16 to a shaft section of the shaft 9 equipped with the braking device 5. Accordingly, one of the motor shafts 16 transmits its movement in rotation to the shaft section 91 of the shaft 9 while the other of the motor shafts 16 transmits its movement in rotation to the shaft section 92 of the shaft 9 equipped with the braking device 5. As an alternative, for an indirect coupling, an intermediate shaft could be disposed between the two motor shafts 16 and the shaft 9 equipped with the braking device 5 without departing from the scope of the invention.

Figure 11:
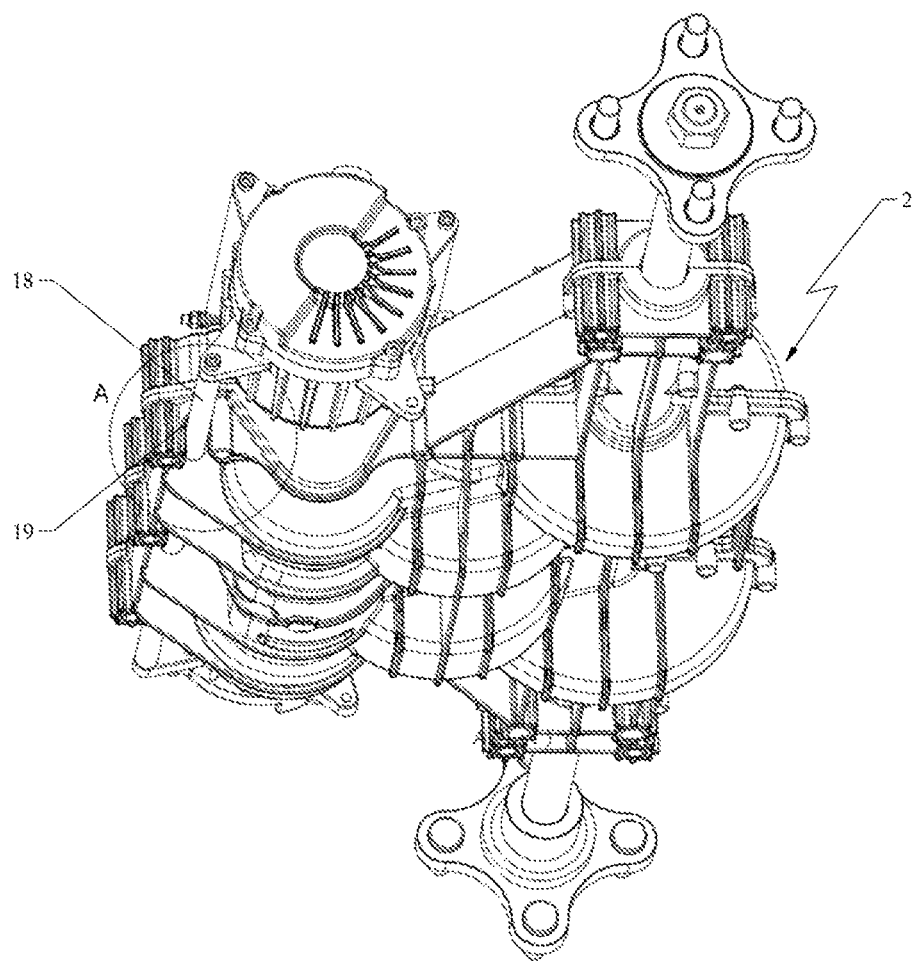
FIG. 11 represents a perspective view of the gearbox with a detailed view of the mounting of the rods on the gearbox.
Figure 11:
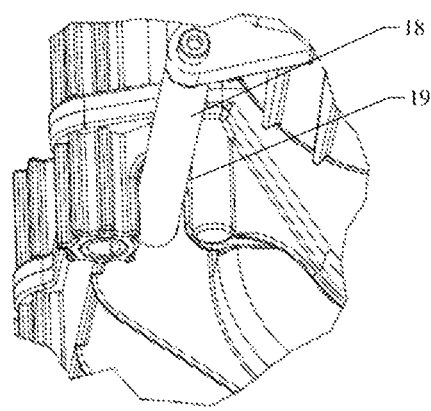

In the examples represented the electric motors 15 are connected by at least three rods 18 extending parallel to the output shaft 4. The gearbox body 2 defines at least one stop 19 for limiting movement of the assembly formed by the rods 18 and the motors 15 about an axis parallel to the output shaft 4. That stop 19 can take the form of at least one notch and/or a through-orifice formed in the body 2 of the gearbox 1. An example of a stop 19 of this kind is given in FIG. 11.

As mentioned hereinabove, the braking device 5 comprises two brakes 61 and 62. Each brake is a cone brake comprising two substantially coaxial parts with conical surfaces surrounding the shaft 9 equipped with the braking device 5 and mounted, one, the so-called male cone, constrained to rotate with one of the shaft sections of said shaft equipped with the braking device, the other, the so-called female cone, fixed in rotation relative to said shaft 9. The shaft 9 is therefore able to turn while the female cone does not turn.

In the figures the male and female cones of the brake 61 are respectively represented at 611 and 612 while the male and female cones of the brake 62 are respectively represented at 621 and 622.

To constrain it to rotate with one of the sections 91 or 92 of the shaft 9 equipped with the braking device 5 each male cone is provided at the level of its central opening with axial splines adapted to cooperate with complementary splines formed on said shaft section.

In the examples represented the female cone 612 of the brake 61 and the female cone 622 of the brake 62 take the form of a wheel with an axial bore with a conical bearing surface. The male cone 611 of the brake 61 and the male cone 621 of the brake 62, preferably of frustoconical general shape, are open centrally so as to be able to be threaded, one onto the shaft section 91, the other onto the shaft section 92 of the shaft 9 equipped with the braking device 5.

The female cone 612 and the male cone 611 of the brake 61, and likewise the female cone 622 and the male cone 621 of the brake 62, are driven in axial relative movement toward one another or away from one another by means of the control member 8. Each time the male cone is, in the close together position of the male and female cones corresponding to the active state of the brake, housed inside the axial bore of the female cone with its conical external peripheral surface engaged by bearing contact with the conical bearing surface of the female cone.

Figure 5:
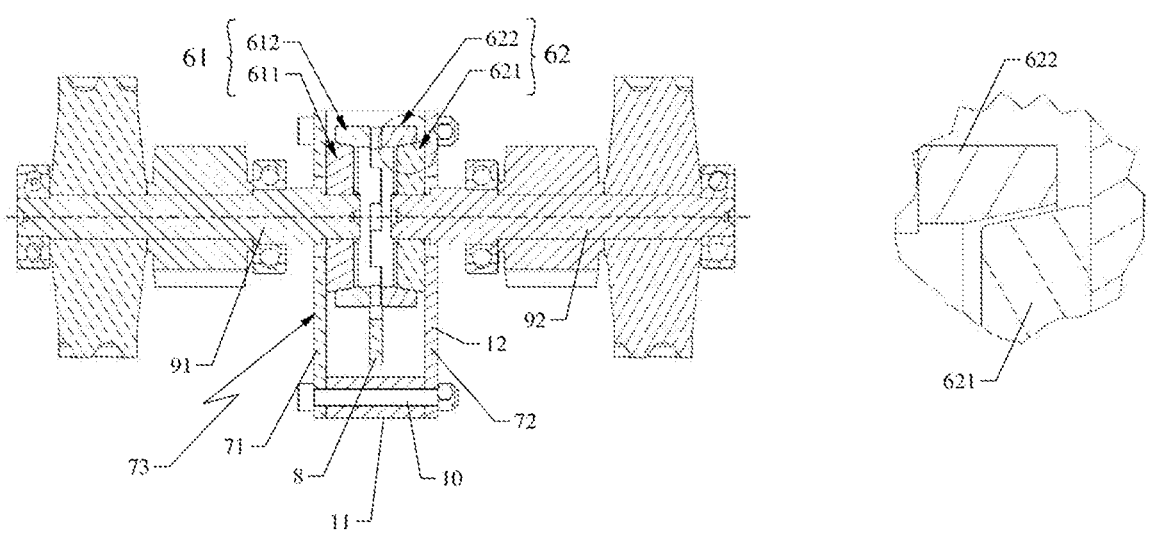
FIG. 5 represents a partial view in section of the shaft equipped with the braking device in the inactive position of the control member with a detail view of the brakes.
Figure 6:
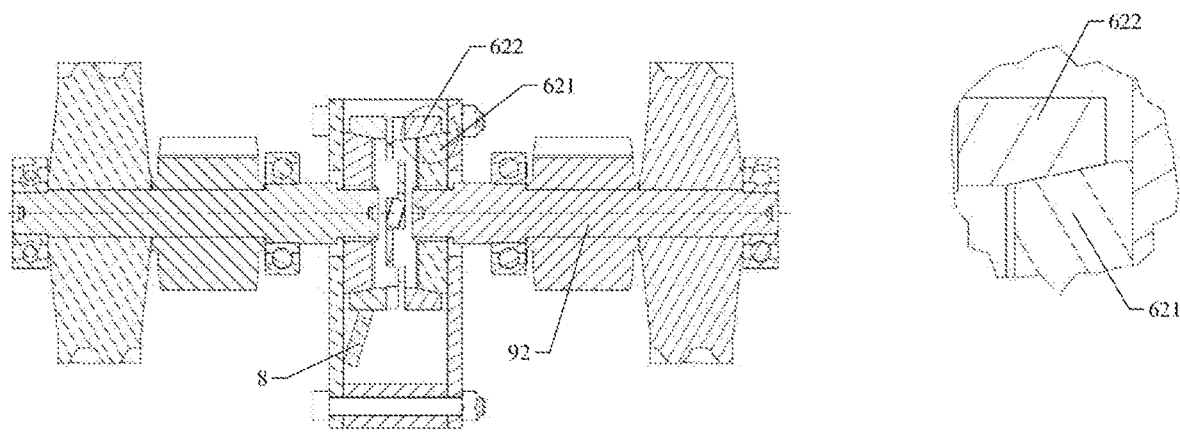
FIG. 6 represents a partial view in section of the shaft equipped with the braking device in the active position of the control member with a detail view of the brakes.
Figure 7:
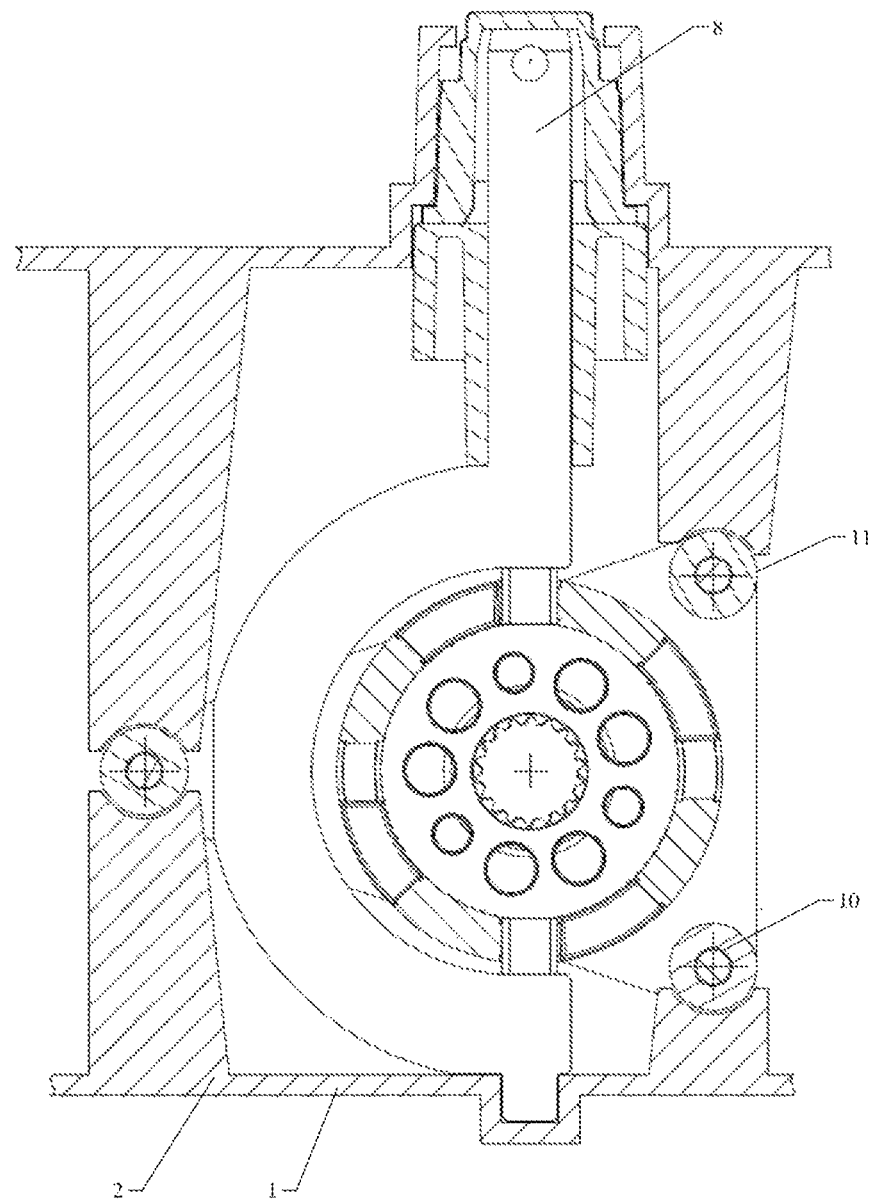
FIG. 7 represents a partial view in cross-section of the shaft equipped with the braking device at the level of the control member.
Figure 8:
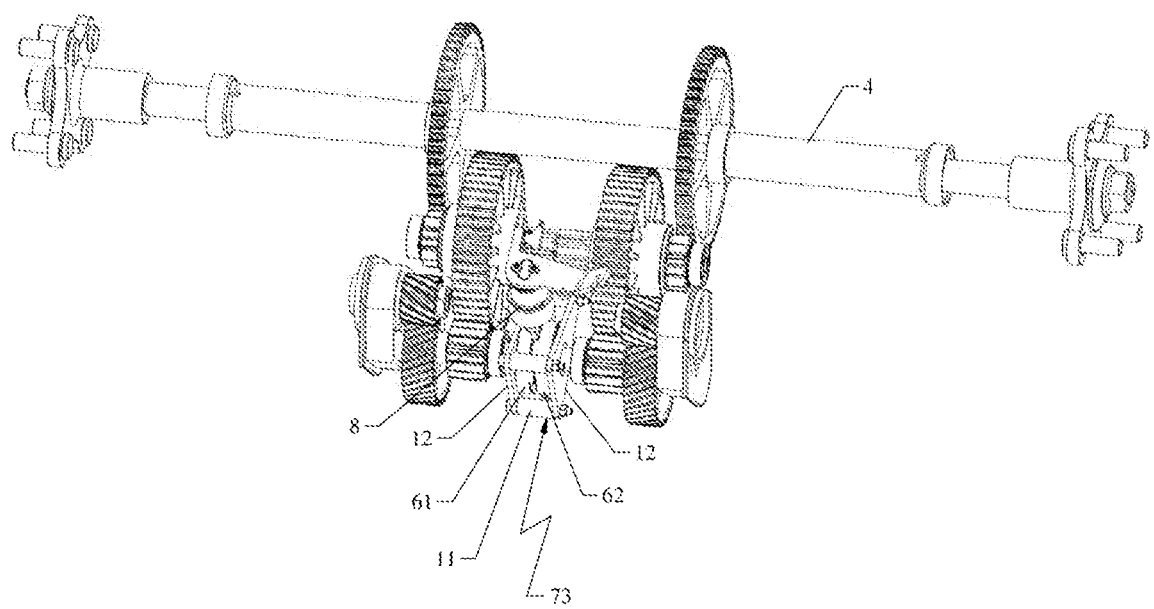
FIG. 8 represents a partial perspective view of the gearbox without the gearbox body.
Figure 9:
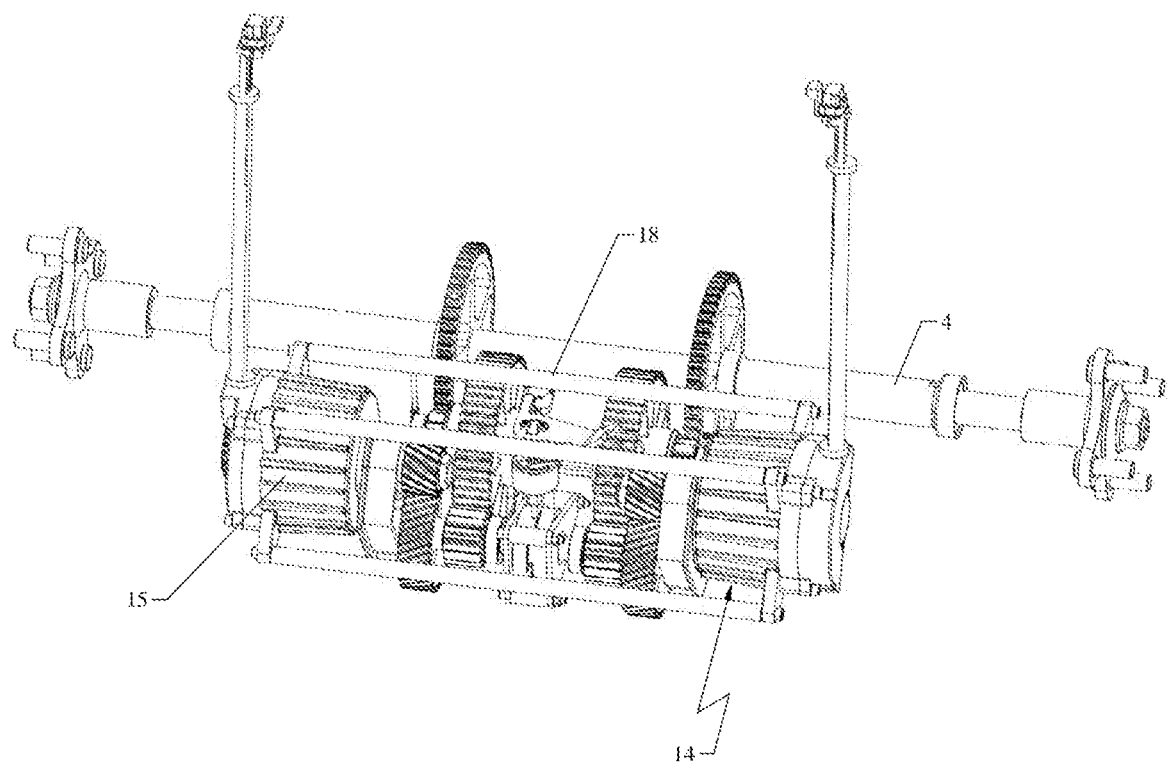
FIG. 9 represents a partial perspective view of the gearbox without the gearbox body.
Figure 10:
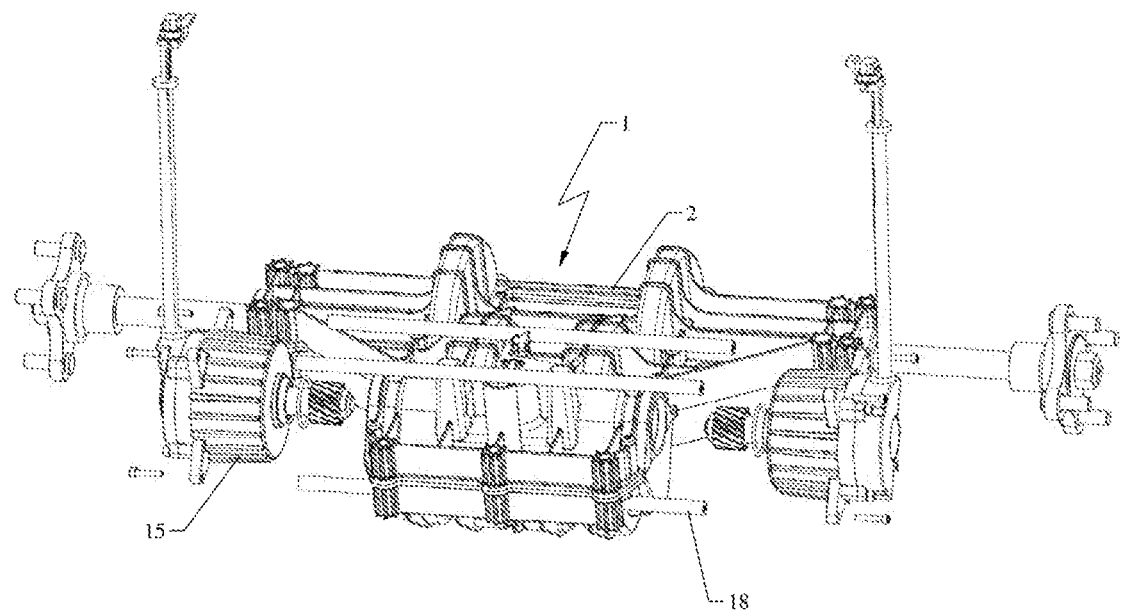
FIG. 10 represents a perspective view of the gearbox.

In the examples represented the inactive state of the brake corresponds to the moved apart position of the male and female cones of the brake. Those active and inactive states of the brake are illustrated in FIGS. 5 and 6. The control member 8 driving movement of the brakes 61 and 62 is a control member 8 for driving movement of the brakes 61 and 62 away from one another for the brakes 61 and 62 to pass from an inactive state to an active state. This control member 8 is common to the two brakes 61 and 62. Here this control member 8 is disposed between the brakes 61 and 62 and mounted to be mobile between an inactive position and an active braking position for the brakes 61 and 62 to pass from an inactive state to an active state.

In the examples represented the control member 8 is an angular movement control member taking the form of a fork with two branches. Each branch of the fork is provided with an internal radial tooth forming the active control part of the common control member 8. The wheels constituting the female cones carry on their facing faces teeth forming a circular crenelation. These teeth of said crenelations interpenetrate, forming between them a free space for insertion of the active control part of the common control member 8.

In the example represented the fork body is the shape of a C or of a U. The branches of said control member 8 are formed by the zone adjoining the free ends of the C or of the branches of the U. Each time, those branches are provided with an internal radial tooth able to come to be housed in the free space between the flanks of two teeth of the crenelations respectively carried one by the female cone 612, the other by the female cone 622.

In the examples represented the fork is provided with only two internal radial teeth disposed diametrically oppositely on the control member 8. Here those internal radial teeth are extended axially and outside said control member 8 to form two shaft sections of square or circular section. These shaft sections are intended to come to be housed inside bearings in the gearbox.

The control member 8 is movable in rotation by means of a control lever positioned outside the gearbox and coming to interengage with one of the branches of said control member 8. The angular movement of the control member 8 causes the female cones to move away from one another. This movement away from one another is obtained by the coming into engagement of the active surfaces of the internal radial teeth of the control member 8 along the flanks of the teeth, of the crenelations of the female cones. Note that the rotation axis of the control member allowing angular movement of the latter extends substantially orthogonally to the axis around which are coaxially disposed the conical surfaces of the male and female cones, this second axis corresponding to the rotation axis of the shaft 9 equipped with the braking device.

As mentioned hereinabove, the braking device 5 further comprises two stops 71 and 72 mechanically coupled to one another and one on each side of said brakes 61 and 62. Those stops 71 and 72 form end-of-travel stops limiting the movement of the brakes 61 and 62 away from one another in the active braking position of the control member 8. Those stops 71 and 72 form an assembly 73 mounted to be mobile axially along the shaft 9 equipped with the braking device 5. This assembly 73 is not constrained to rotate with said shaft 9 or with at least one of the sections of said shaft. Accordingly, the shaft 9 or at least one of the sections of said shaft equipped with the braking device 5 is able to turn without the assembly formed by the stops turning.

This assembly 73 formed by the stops 71 and 72 may be mounted relative to the shaft 9 equipped with the braking device 5 so it is either fixed in rotation or limited in angular movement inside the gearbox body.

Independently of their design, in the coupled state the stops 71 and 72 define between them a gap of fixed maximum length. Those stops 71 and 72 are coupled to one another by means of screw/nut type connecting members 10 and held at a distance from one another by spacers 11 mounted on the connecting members 10. The spacers 11 can take the form of simple sleeves. Each sleeve has passed through it the screw of the coupling member. For their part each of the stops 71 and 72 takes the form of a plate 12 with a bore 13 through it so that the shaft 9 equipped with the braking device 5 can pass through it. Here the plates are triangular. Each spacer 11 therefore extends between the plates. In the case of a spacer in the form of a sleeve, each end of the sleeve may be in bearing contact with the face of the plate facing the other plate. Cradle type shapes are formed in the gearbox to partially surround the spacer sleeves and to immobilise against rotation of the assembly 73 formed by the stops 71 and 72 inside said gearbox.

The system for driving the shaft 9 and the braking device 5 in rotation operates as follows. It is assumed that the shaft 9 equipped with the braking device 5 is turning and that each section of said shaft 9 is transmitting its movement in rotation to a section of the output shaft 4. It is assumed that the control member 8 is in the inactive position. From their driver station, the driver of the vehicle therefore commands angular movement of the control member 8. Upon that angular movement of the control member 8 the female cone 612 tends to move closer to the male cone 611 while the female cone 622 tends to move closer to the male cone 621. In the extreme close together position the conical surface of the male cone 611 is in bearing contact with the conical bearing surface of the female cone 612. The same goes for the pair of cones 621 and 622. In this position the conical surfaces of the male and female cones are in bearing contact so that the shaft 9 is braked. To enable release of the brakes it suffices to move the control member 8 angularly in the opposite direction. Note that the passage from the braked position to the brakes released position and vice-versa involves an axial movement of only a few millimetres of the female cones along the shaft 9.

To ensure coordination of the operation of the electric motors 15 and of the braking device 5, the electric motors 15 are associated with a control unit 17 and the control unit 17 is configured to command the passage from the running state to the stopped state of said electric motors as a function of the position occupied by the control member 8 for driving movement of the brakes. Accordingly, when the driver of the vehicle commands the angular movement of the drive control member 8 to move the brakes in the direction of activation of the brakes, a control signal is sent in parallel with this to the control unit of the electric motors 15 to command stopping of the electric motors 15. Note that despite the compactness of the braking device the wheels of the vehicle can be driven at different rotation speeds and braked.

The invention claimed is:

1. A gearbox comprising:
at least one gearbox body delimiting at least one cavity and housed at least partly inside the cavity,
at least one output shaft, and
a braking device mounted on a rotary shaft,
said braking device comprising two activatable brakes, two stops coupled mechanically to one another and one on each side of said brakes, and a control member for driving said brakes in movement in the direction away from or toward one another for the brakes to pass from an inactive state to an active state, this control member, common to the two brakes, being mounted to be mobile between an inactive position and an active braking position for the brakes to pass from an inactive state to an active state, at least one of the stops forming an end-of-travel stop limiting the movement of the brakes in the active braking position of the control member, each brake being a cone brake comprising two parts with substantially coaxial conical surfaces surrounding the shaft equipped with the braking device,
wherein the shaft equipped with the braking device is formed of at least two coaxial shaft sections mounted to rotate freely relative to one another and each provided with one of the brakes of the braking device, in that one of the two parts with conical surfaces of each brake, termed the male cone, is mounted on and constrained to rotate with one of the shaft sections of said shaft equipped with the braking device, in that the other of the two parts with conical surfaces of each brake, termed the female cone, is mounted on and fixed against rotation relative to said shaft, and in that said stops form an assembly mounted so as to be movable axially along the shaft equipped with the braking device, this assembly being not constrained to rotate with said shaft or at least one of the sections of said shaft.

2. The gearbox as claimed in claim 1, the output shaft is formed of at least two coaxial shaft sections mounted to rotate freely relative to one another, in that the output shaft is the shaft equipped with the braking device or extends parallel to the shaft equipped with the braking device, and in that the shaft sections provided with a brake of the shaft equipped with the braking device are, when the shaft equipped with the braking device is separate from the output shaft, engaged directly or indirectly, one with one of the shaft sections of the output shaft, the other with the other of the shaft sections of the output shaft.

3. The gearbox as claimed in claim 1, wherein the assembly formed by the stops is mounted so it is fixed against rotation or limited in angular movement relative to the shaft equipped with the braking device.

4. The gearbox as claimed in claim 1, wherein the stops in the coupled state define between them a gap of fixed maximum length.

5. The gearbox as claimed in claim 1, wherein the stops are coupled to one another by means of screw/nut type connecting members and held at a distance from one another by spacers mounted on said connecting members.

6. The gearbox as claimed in claim 1, wherein the stops each take the form of a plate provided with a through-bore so that the shaft equipped with the braking device is able to pass through them.

7. The gearbox as claimed in claim 1, wherein the control member driving movement of said brakes is a control member driving movement of the brakes away from one another for the brakes to pass from an inactive state to an active state, in that this control member, common to the two brakes, is disposed between said brakes and mounted to be mobile between an inactive position and an active braking position for the brakes to pass from an inactive state to an active state, and in that said stops forming end-of-travel stops limiting the movement of the brakes away from one another in an active braking position of the control member.

8. The gearbox as claimed in claim 1, wherein said gearbox comprises a system for driving in rotation the shaft equipped with the braking device and in that said system is configured to allow driving in rotation of the shaft sections provided with a brake of the shaft equipped with the braking device at different rotation speeds.

9. The gearbox as claimed in claim 1, wherein said gearbox comprises two electric motors disposed outside the body of the gearbox and carried by said body, each motor being equipped with a motor shaft, said motor shafts being coupled directly to or indirectly, one with one of the shaft sections, the other with the other or another of the shaft sections of the shaft equipped with the braking device.

10. The gearbox as claimed in claim 9, wherein the electric motors are connected by at least three rods extending parallel to the output shaft and in that the gearbox body defines at least one stop limiting movement of the assembly formed by the rods and the motors about an axis parallel to the output shaft.

11. A self-propelled wheeled vehicle equipped with a gearbox, wherein the gearbox conforms to claim 1.

* * * * *